UNITED STATES PATENT OFFICE.

WILHELM JAGELKI, OF DÜREN, GERMANY, ASSIGNOR TO THE FIRM OF DR. DEGEN & KUTH, OF DÜREN, GERMANY.

PROCESS FOR THE PRODUCTION OF AN ORGANIC SOLUBLE IRON PREPARATION.

No. 902,234.  Specification of Letters Patent.  Patented Oct. 27, 1908.

Application filed May 28, 1908. Serial No. 435,529.

*To all whom it may concern:*

Be it known that I, WILHELM JAGELKI, Ph. D., chemist, a subject of the King of Prussia, and resident of Düren, Rhenish Prussia, in the Kingdom of Prussia, German Empire, have invented a new and useful Process for the Production of an Organic Soluble Iron Preparation, of which the following is an exact specification.

This invention relates to the production of a medicinal soluble preparation prepared from iron salts and rhubarb roots and other oxymethyl-anthrachinon holding drugs and substances.

Hitherto the fluid preparations from iron salts and oxymethyl-anthrachinon containing substances were considered as incompatible drug mixtures (see Hager, *Pharmaceutische Praxis*, Volume II page 735), that is to say, the precipitates of mixtures of iron salts and such substances when separated cannot be again dissolved either by means of the additions of acids or alkalies.

The present invention enables the production of compounds soluble in water and composed of the above mentioned materials, that is to say of iron salts and oxymethyl-anthrachinon containing substances. This result is effected by dissolving the precipitated and washed products in an alkali in presence of mannite. Instead of mannite any other compound containing one or more alcohol groups may be used.

In order to make the invention clear a particular example is herein given. 70 parts of hot water are poured on 10 parts of coarsely cut rhubarb roots placed in a suitable percolator to which steam is led. After standing for about half an hour 30 parts are drawn off. The roots are then thoroughly exhausted by further percolation and after the last percolation process the fluid extract thus obtained is evaporated till only 10 parts remain. These 10 parts are united to the 30 parts first drawn off. The whole extract is then filtered through flannel and the filtered product slowly poured while stirring into a mixture of 36 parts of a solution of iron chlorid having a specific gravity of 1.281 and 50 parts of water. This mixture is then neutralized in a diluted caustic soda solution and the resulting precipitate purified by dialysis and till it is free from chlorin. After this the precipitate is suitably separated from the fluid, for instance by sucking off the said fluid by means of a suction pump, and the separated precipitate is intimately mixed with 92 parts of mannite. ¾ parts of caustic soda solution having a strength of 15% are then added and the whole stirred carefully and warmed in a steam heated vessel. In this way a perfect solution is soon obtained. This solution may be diluted with water to the desired strength or the solvent may be evaporated. In the latter case the remaining product is a gray neutral powder which is soluble in water and contains about 10% of substances extracted from rhubarb and 3.6% of iron.

The formation of a precipitate may be avoided if the mannite is dissolved in the iron containing solution and the rhubarb solution added after the alkali.

The product according to the present invention is a medicine applicable to various diseases. Thus in the case of chlorosis a minimum dose for an adult is 5 grams, a maximum 100 grams and an average 20 grams taken three times daily in a small quantity, say a table-spoonful of water. These proportions are also suitable for anemic persons and those suffering from cachexy. For dyspepsia and anorexy the proportions are 5 grams as a minimum dose, 80 grams as a maximum and 20 as an average, taken twice daily in a table-spoonful of water; for constipation, a minimum dose of 10 grams, an average of 30 and a maximum of 100 grams taken twice daily in two table-spoonsful of water; for leucorrhea, 10 to 100 grams or an average of 25 grams taken three times daily in a table-spoonful of water; for all other diseases which are the consequence of anemia or chlorosis the doses are the same as for chlorosis.

I claim:—

1. The process of producing a preparation of iron salts and oxymethyl-anthrachinon containing substances, which is soluble in water, consisting in mixing an iron salt solution with the fluid extract of the oxymethyl-anthrachinon containing substance forming thereby a precipitate, and dissolving said precipitate in a caustic alkali solution in the presence of a compound containing an alcohol group.

2. The process of producing a preparation of an iron salt solution and the fluid extract of rhubarb roots containing oxymethyl-anthrachinon, which is soluble in water, said process consisting in mixing the iron salt solution with the fluid extract of rhubarb roots forming thereby a precipitate, and dissolving said precipitate in a caustic alkali solution in the presence of a compound containing an alcohol group.

3. The process of producing a preparation of an iron salt solution and the fluid extract of rhubarb roots containing oxymethyl-anthrachinon, which is soluble in water, said process consisting in mixing the iron salt solution with the fluid extract of rhubarb roots forming thereby a precipitate, and dissolving said precipitate in a caustic alkali solution in the presence of mannite.

4. The process of producing a preparation of iron salts and the fluid extract of rhubarb roots containing oxymethyl-anthrachinon consisting in extracting the coarsely cut rhubarb roots by percolation, filtering the extract, adding to said fluid extract an iron salt solution, forming thereby a precipitate, separating same from the liquid, adding mannite and dissolving this mixture in a solution of caustic alkali.

In witness whereof I have hereunto set my hand in the presence of two witnesses.

WILHELM JAGELKI.

Witnesses:
   HENRY QUADFLIEG,
   ELISE KALBURCK.